(12) United States Patent
Karram et al.

(10) Patent No.: US 10,982,708 B2
(45) Date of Patent: Apr. 20, 2021

(54) SPRING WASHER COMPRESSION LIMITER

(71) Applicant: GM GLOBAL TECHNOLOGY OPERATIONS LLC, Detroit, MI (US)

(72) Inventors: Michael A. Karram, Flint, MI (US); Terrence J. Christensen, Franklin, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 16/282,987

(22) Filed: Feb. 22, 2019

(65) Prior Publication Data
US 2020/0271152 A1    Aug. 27, 2020

(51) Int. Cl.
F16B 43/00     (2006.01)
F16B 39/24     (2006.01)

(52) U.S. Cl.
CPC .................................. F16B 39/24 (2013.01)

(58) Field of Classification Search
CPC .......... F16B 43/00; F16B 19/02; F16B 39/24; F16B 5/0266
USPC .................................................. 411/544, 546
See application file for complete search history.

(56) References Cited

U.S. PATENT DOCUMENTS

| 436,737 | A | * | 9/1890 | Lewis | F16B 39/24 411/156 |
| 1,641,059 | A | * | 8/1927 | Tausch | F16F 1/32 411/155 |
| 4,435,112 | A | * | 3/1984 | Becker | F16B 5/02 29/453 |
| 9,587,664 | B2 | * | 3/2017 | Bisset | F16B 41/002 |
| 10,711,823 | B2 | * | 7/2020 | Lee | F16B 39/26 |
| 2013/0287520 | A1 | * | 10/2013 | Hartzler | F16B 5/0241 411/347 |
| 2019/0234448 | A1 | * | 8/2019 | Owens, II | B60R 13/08 |

OTHER PUBLICATIONS

U.S. Appl. No. 16/016,983, filed Jun. 25, 2018 by GM Global Technology Operations LLC, titled "Bolt Compression Limiter."
Washer Special, Part No. 90501187701, available at http://images.cmsnl.com/img/products/washer-special_medium90501187701-01_fc61.jpg, printed on May 31, 2019.
Mk1 Golf Rear Beam Pivot Dome Washer 171501548, Classic-vw.co.uk, available at https://www.classic-vw.co.uk/mk1-golf-rear-beam-pivot-dome-washer-171501548-3106-p.asp, printed on May 31, 2019.

* cited by examiner

*Primary Examiner* — Flemming Saether
(74) *Attorney, Agent, or Firm* — Lorenz & Kopf, LLP

(57) ABSTRACT

A limiting spring washer includes a main body portion and a side portion, which may be a frustoconical, extending from the main body portion. The main body portion defines a washer aperture therethrough. The main body portion is thicker than the side portion. A bolt assembly includes a part defining a part aperture therethrough. A limiter is disposed within the part aperture. A bolt is configured to attach the part to an item. In the bolt assembly, the limiting spring washer is disposed in contact with the limiter, the bolt, and the part. The bolt is configured to apply a total load, a first portion of the total load being absorbed by the part, and a second portion of the total load being absorbed by the limiter.

20 Claims, 3 Drawing Sheets

SPRING WASHER COMPRESSION LIMITER

FIELD

The present disclosure relates to a spring washer with a compression limiter feature, which may be used in a bolt assembly.

INTRODUCTION

In various bolt assemblies, two components are joined together with a bolt. One component, for example, can be a flange, such as a flange for an intake manifold of an automotive engine. In some arrangements, a limiter is placed within the flange to provide structural support to the flange and to absorb some of the bolt load that would otherwise be applied to the flange. The limiter is especially useful where the flange may be formed of a different material from the bolt and/or the component to which the flange is attached by the bolt. Thus, the limiter may take some of the load from the bolt off of the flange itself, to assist in prevent drift of the attached components.

A spring washer, such as a Belleville spring, may also be used to improve bolt clamp load retention. Such a Belleville spring, however, is not always stabile between the bolt and the limiter because when the spring washer is compressed between the bolt and the limiter, the spring washer becomes diagonally disposed between them and does not provide a flat surface to compress the bolt against. As a result, the flange and the component to which the flange is attached by the bolt assembly may eventually drift away from one another as the spring washer moves around under fatigue and/or wear.

Accordingly, there is a need for a new and improved assembly that minimizes or prevents damage to the flange while maintaining a connection between the parts being joined even after extensive use.

SUMMARY

The present disclosure provides an improved spring washer that includes a compression limiter feature, which provides for a flat surface contact between the spring washer and the bolt, and also between the spring washer and the limiter.

In one variation, which may be combined with or separate from the other variations provided herein, a limiting spring washer is provided that includes a main body portion and a side portion extending from the main body portion. The main body portion defines an aperture therethrough, and the main body portion has a main body thickness. The side portion has a leg thickness, but the main body thickness is greater than the leg thickness.

In another variation, which may be combined with or separate from the other variations described herein, a bolt assembly is provided that includes a part defining a part aperture therethrough and a bolt configured to attach the part to an item. A limiter is disposed within the part aperture. A limiting spring washer is disposed in contact with the limiter, the bolt, and the part. The limiting spring washer has a main body portion and a frustoconical portion extending from the main body portion. The main body portion defines a washer aperture therethrough. The main body portion has a main body thickness, and the frustoconical portion has a leg thickness, where the main body thickness is greater than the leg thickness. The bolt is configured to apply a total load, a first portion of the total load being absorbed by the part, and a second portion of the total load being absorbed by the limiter.

Additional features may optionally be provided, including but not limited to the following:

The main body portion of the limiting spring washer may have a flat base surface disposed in a base plane;

The side portion may be frustoconical;

The side portion (or frustoconical portion) may extend at an angle with respect to the base portion in an uncompressed state; and the angle may be in the range of 110 degrees to 178 degrees;

The main body portion of the limiting spring washer may have an external surface opposite the base surface and disposed in an outer plane that is parallel to the base plane;

The main body thickness may extend between the base surface and the external surface;

The external surface and the outer plane may be offset from the side portion (or frustoconical portion);

The side portion (or frustoconical portion) may define a circular outer edge that is offset from the base plane and the outer plane;

The main body portion may define a solid annulus having the main body thickness;

The main body portion may include an inner portion and an outer portion;

The base surface may be disposed on the inner portion and the external surface being disposed on the outer portion;

The outer portion may be folded onto the inner portion via a connecting portion;

The main body thickness may be defined as extending through both the inner and outer portions;

The limiting spring washer may be formed of a spring steel;

The bolt may include a head and a shaft;

The limiter may define a limiter aperture therethrough;

The shaft may be disposed within the limiter aperture and through the washer aperture of the limiting spring washer;

The bolt head may have a contact surface contacting the main body portion of the limiting spring washer;

The contact surface may be free of contact with the limiter;

The contact surface may be free of contact with the frustoconical portion of the limiting spring washer;

The limiter may define an upper surface in an upper plane;

The upper plane may be coplanar with the base plane such that the base surface of the limiting spring washer is flatly pressed against the upper surface of the limiter;

The contact surface may be disposed in a contact plane;

The contact surface may contact the external surface of the main body portion of the limiting spring washer;

The outer plane may be coplanar with contact plane such that the external surface of the limiting spring washer is flatly pressed against the contact surface of the head of the bolt;

The frustoconical portion of the limiting spring washer may contact the part;

The main body portion of the limiting spring washer may define a solid annulus having the main thickness;

The part may be formed of a composite material, and/or the limiter may be formed of a metallic material; and At least 54% of the total load may be absorbed by the limiter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
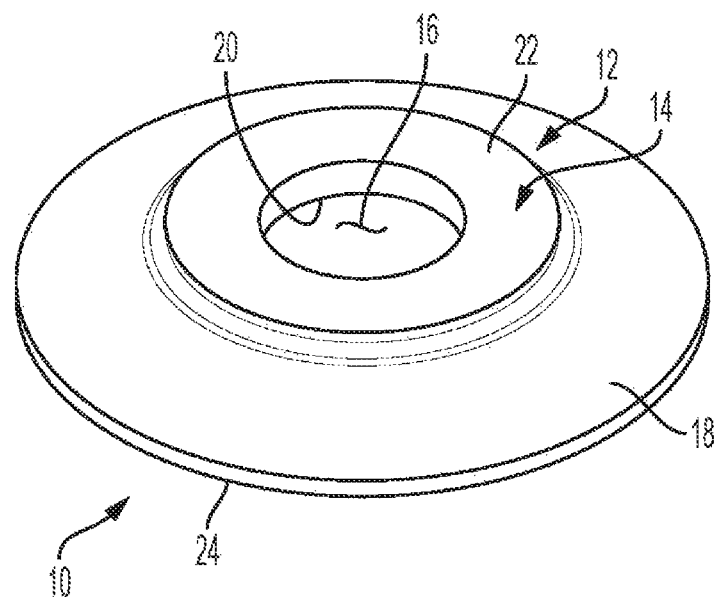
FIG. 1A is a perspective view of a limiting spring washer in an uncompressed state, in accordance with the principles of the present disclosure.
Figure 1B:
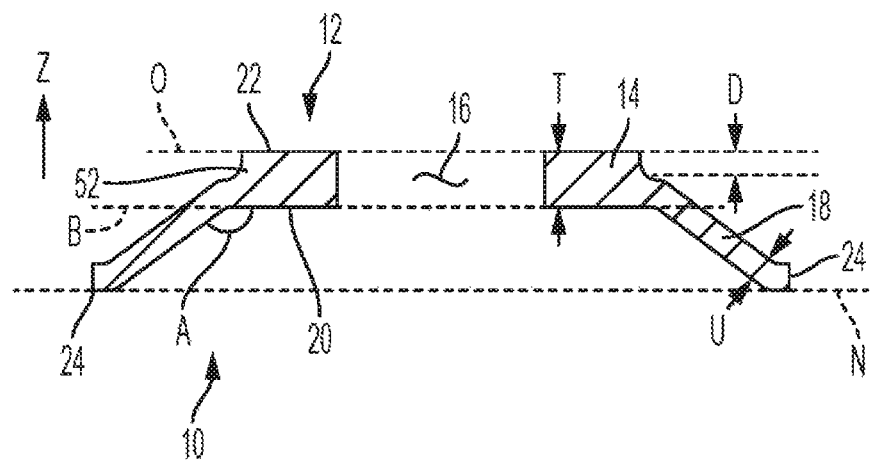
FIG. 1B is a cross-sectional view of the limiting spring washer shown in FIG. 1 in the uncompressed state, according to the principles of the present disclosure.

Referring now to the figures, wherein like numerals indicate like components, FIGS. 1A-1B show a limiting spring washer 10 in an uncompressed state. The limiting spring washer 10 is referred to as "limiting" because it has a compression limiter feature 12, which is described in further detail herein.

The limiting spring washer 10 includes a main body portion 14 defining an aperture 16 therethrough. A side portion 18 extends from the main body portion 14. The side portion 18 may be frustoconical or may have another shape, such as an arcuate shape. For the sake of simplicity, the side portion 18 is hereafter referred to as the frustoconical portion 18.

The main body portion 14 has a flat base surface 20 disposed in a base plane B. The frustoconical portion 18 extends at an angle A with respect to the base portion 20 in an uncompressed state, as shown in FIG. 1B. The angle A may be, for example, in the range of 110 degrees to 178 degrees in the uncompressed state. The frustoconical portion 18 is compressible, and the limiting spring washer 10 is a variation of a Belleville spring, where the frustoconical portion 18 bends when the limiting spring washer 10 is compressed by a bolt.

The main body portion 14 of the limiting spring washer 10 also has an external surface 22 opposite the base surface 20, which is disposed in an outer plane O. The outer plane O is parallel to the base plane B. The external surface 22 and the outer plane O are offset a distance D from the frustoconical portion 18. The frustoconical portion 18 defines a circular outer edge 24 that is offset from the base plane B and the outer plane O. The circular outer edge 24 lies in a plane N in the uncompressed state shown in FIGS. 1A-1B. Thus, the plane N is offset from and parallel to the planes B and O.

The main body portion 14 has a main body thickness T. The main body thickness T extends between the base surface 20 and the external surface 22. The frustoconical portion 18 has a leg thickness U. The main body thickness T is thicker than the leg thickness U of the frustoconical portion 18; and in the illustrated example, the main body thickness T is substantially greater than the leg thickness U. For example, the main body thickness T may be twice as thick or one-and-a-half times as thick as the leg thickness U. The greater thickness T of the main body portion 14 creates the limiter feature 12, which is a standoff feature that extends outwardly away from the frustoconical portion 18 in the direction Z shown in FIG. 1B. In the example of FIGS. 1A-1B, the main body portion 14 defines a solid annulus having the main body thickness T.

Figure 2A:
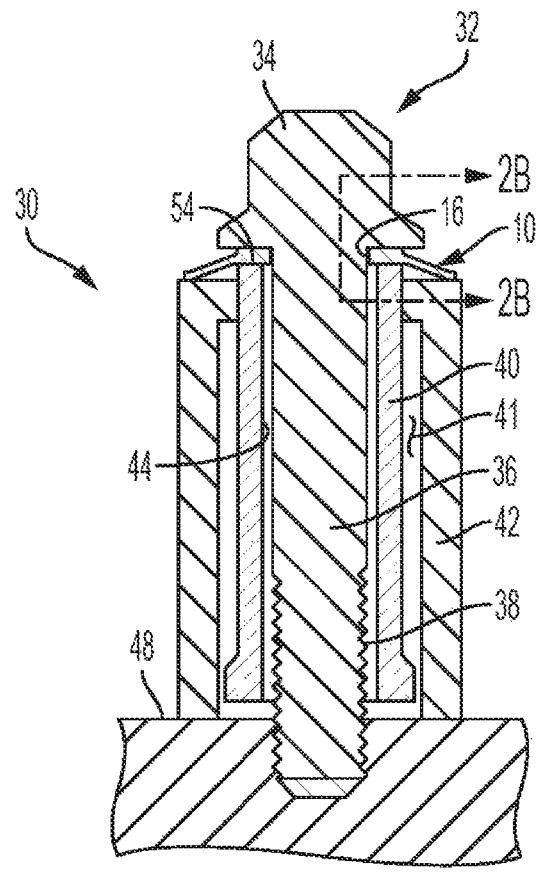
FIG. 2A is a cross-sectional view of a bolt assembly including the limiting spring washer of FIGS. 1A-1B, in accordance with the principles of the present disclosure.
Figure 2B:
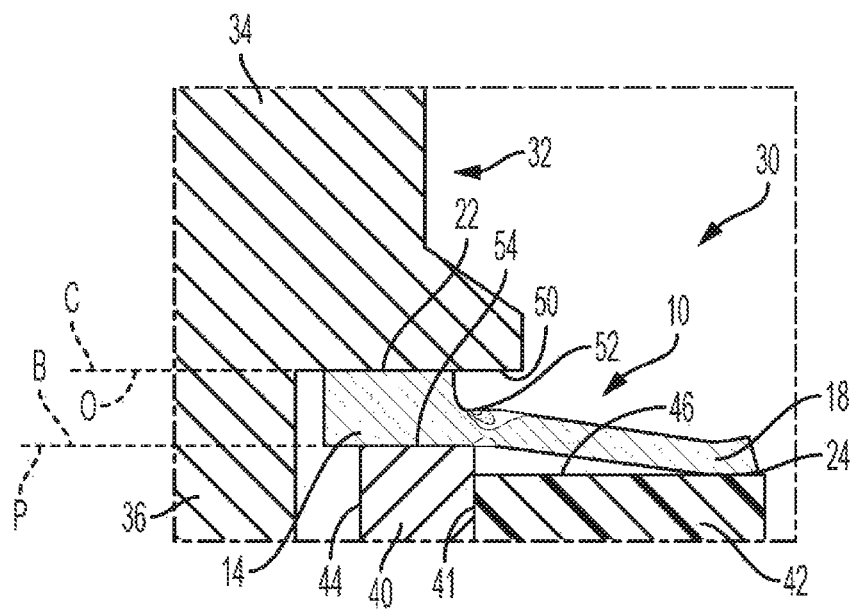
FIG. 2B is a close-up cross-sectional view of a portion of the bolt assembly of FIG. 2A, taking along lines 2B-2B in FIG. 2A, in accordance with the principles of the present disclosure.

Referring now to FIGS. 2A and 2B, the limiting spring washer 10 is shown installed within bolt assembly 30. FIG. 2B is a close-up of the portion of FIG. 2A taken along the lines 2B-2B, to show the illustrated elements in greater detail. The bolt assembly 30 includes a bolt 32 that has a bolt head 34 and a shaft 36. The bolt shaft 36 typically has a threaded portion 38. The bolt shaft 36 passes through the washer aperture 16 within the main body portion 14 of the limiting spring washer 10.

The bolt assembly 30 further includes a limiter 40 positioned within an aperture 41 formed within a part 42, where the part 42 could be a flange of an intake manifold. The limiter 40 may be press fit into the part 42 to provide structural support for the part 42. Alternatively, the limiter 40 may be loosely slid into the part 42 and may be held in place by a retention feature. The limiter 40 is generally formed of a metallic material, such as steel. The part 42 may be formed of a metallic material or a composite material. The composite material may be a composite plastic, such as a short glass fiber reinforced nylon. The limiting washer assembly 10 is preferably formed of a spring steel, which typically has a very high yield strength, such as a steel alloy that has a relatively low amount of manganese and a medium or high amount of carbon.

The limiter 40 is generally cylindrical in shape and has an aperture 44 formed therethrough. In the illustrated example, the limiter 40 extends beyond of the top surface 46 of the flange or part 42. The threaded portion 38 of the bolt shaft 36 passes through the aperture 44 of the limiter 40 and is threaded into another component 48 to join the part 42 to the component 48. For example, the component 48 could be an engine cylinder to which the bolt assembly 30 attaches an intake manifold flange, which is the part 42. However, it should be noted that the part 42 and the component 48 could be other items, such as parts of a water pump. The limiting spring washer 10 described herein is especially beneficial when used to a join items formed of dissimilar materials, such as joining a metallic component 48 to a composite part 42.

As the bolt 32 is tightened and threaded into the component 48, the bolt head 34 applies a load to the limiting spring washer 10, to the limiter 40, and to the part 42. Without the limiter feature 12 formed by the main body portion 14 of the limiting spring washer 10, the contact surface 50 the bolt head 34 would contact the frustoconical portion 18 and apply an undesired load at the connection 52 between the main body portion 14 and the frustoconical portion 18. Moreover, omitting the limiting spring washer 10 entirely may cause damage to the part 42, especially if the part 42 is formed of a composite material and the bolt 32 is formed of metal. The limiter feature 12, however, eliminates these issues.

When the bolt 32 is tightened, the bolt head 34 applies a load onto the limiting spring washer 10 through the limiter feature 12. The limiting spring washer 10 is disposed in contact with the limiter 40, the bolt 32, and the part 42, and therefore, the load applied through the limiting spring washer 10 is transferred from the bolt 32 to the limiter 40 and to the part 42. More particularly, the load is transferred from the bolt 32 onto the limiter feature 12 of the limiting spring washer 10. The limiting spring washer 10 then transfers a first portion of the load onto the limiter 40 through the main body portion 14 and a second portion of the load onto the part 42 through the frustoconical portion 18 to stabilize the bolt assembly 30 such that the bolt 32 is prevented from loosening from the bolt assembly 30. Thus, a first portion of the total load is absorbed by the part 42 and a second portion of the total load is absorbed by the limiter 40.

In the illustrated example, the load applied to the limiter 40 is greater than the load applied to the part 42. For example, in various arrangements, the load applied to the limiter 40 may be at least 54% of the total load applied to the bolt assembly 30 with the bolt 32, with the load applied to the part 42 being 46% or less of the total load. In some examples, the load applied to the limiter 40 may be at least 55% of the total load applied to the bolt assembly 30, with the load applied to the part 42 being 45% or less of the total load. As such, damage to the part 42 is minimized or eliminated, especially when the part 42 is a flange made of composite materials.

When the bolt assembly 30 is installed with the bolt 32 tightened, the contact surface 50 of the bolt head 34 is free of contact with the limiter 40, and therefore, the bolt head 34 does not crush the limiter 40. Furthermore, the contact surface 50 of the bolt head 34 is free of contact with the frustoconical portion 18 of the limiting spring washer 10, and therefore, the bolt head 34 does not directly press against or contact the connection 52 between the frustoconical portion 18 and the main body portion 14, nor any part of the frustoconical portion 18.

The inventive limiting spring washer 10 provides a stabile transfer of the load from the bolt 32. For example, the base surface 20 of the main body portion 14 of the limiting spring washer 10 is flat and disposed within the base plane B. The limiter 40 defines an upper surface 54 in an upper plane P. The upper plane P is coplanar with the base plane B, such that the base surface 20 of the limiting spring washer 10 is flatly pressed against the upper surface 54 of the limiter 40.

Furthermore, the contact surface 50 of the bolt head 34 flatly contacts the external surface 22 of the main body portion 14 of the limiting spring washer 10. More particularly, the contact surface 50 is disposed in a contact plane C, and the contact surface 50 contacts the external surface 22 of the main body portion 14 of the limiting spring washer 10, which is flat and disposed in the outer plane O. The outer plane O is coplanar with contact plane C such that the external surface 22 of the limiting spring washer 10 is flatly pressed against the contact surface 50 of the head 34 of the bolt 32. Such flat contact between the contact surface 50 of the bolt and the external surface 22 of the main body portion 14, as well as between the upper surface 54 of the limiter 40 and the base surface 20 of the main body portion 14 provides for a stabile connection formed by the bolt assembly 30.

Further stability is provided by the frustoconical portion 18, which contacts the part 42. Because there is no direct contact between the frustoconical portion 18 or the connecting portion 52 and the bolt 32, the bending arm created by the frustoconical portion 18 is longer than it would be if the bolt head 34 were to contact a part of the frustoconical portion 18 and compress against it. The bending arm is able to extend from the connecting portion 52 to the circular outer edge 24 of the frustoconical portion 18. The greater bending arm length provides for more tolerance variation capability. Since the bending arm length is able to begin at the connection portion 52, packaging space is reduced because the length is as long as it can be for the size of the provided frustoconical portion 18 rather than requiring added length due to a bending arm that starts at a point along the length of the frustoconical portion 18.

Figure 3:
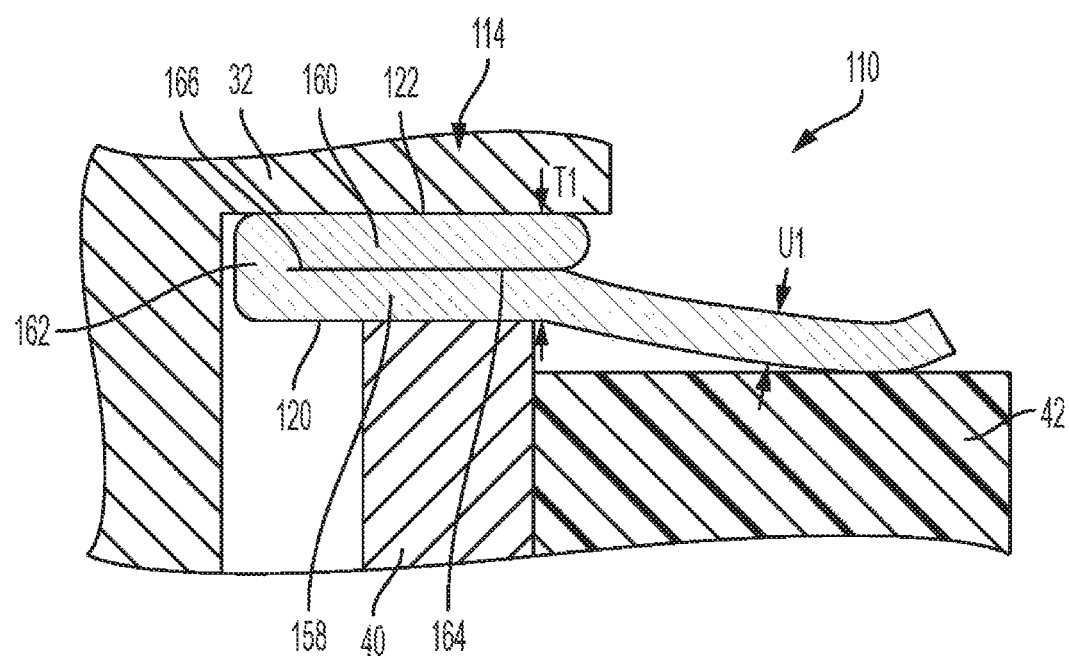
FIG. 3 is a cross-sectional view of a portion of another bolt assembly having another variation of a limiting spring washer, according to the principles of the present disclosure.

Referring now to FIG. 3, another variation of a limiting spring washer 110 is shown in a half cross-sectional view. It should be understood that the limiting spring washer 110 could be used in place of the limiting spring washer 10 shown in the bolt assembly 30 of FIGS. 2A-2B. In addition, unless the limiting spring washer 110 is described as being different from the limiting spring washer 10, it should be understood that the description above with respect to the limiting spring washer 10 applies equally to the limiting spring washer 110. In the illustrated example, the limiting spring washer 110 is shown compressed between the bolt 32 and the limiter 40 and the part 42. Accordingly, the frustoconical portion 118 is compressed in FIG. 3.

Instead of having a single solid annulus forming the main body portion 14 as shown in FIG. 1B, the limiting spring washer 110 of FIG. 3 has a main body portion 114 that includes an inner portion 158 and an outer portion 160. The main body portion 114 still has a flat base surface 120, which is disposed on the inner portion 158, in this example. The main body portion 114 has a flat external surface 122 that is disposed on the outer portion 160. Ideally, the base surface 120 and the external surface 122 are parallel, or substantially parallel, to one another.

The outer portion 160 is folded onto the inner portion 158 via a connecting portion 162. Thus, the outer portion 160 has an inner surface 164 and the inner portion 158 has an outer surface 166 that are sandwiched together, in contact with one another, and parallel to one another.

The main body thickness T1 is defined as extending through both the inner and outer portions 158, 160. The thickness U2 of the frustoconical portion 118 is less than the main body thickness T1. More particularly, in this example, each of the inner and outer portions 158, 160 have the thickness U1, and therefore, the thickness T1 of the main body portion 14 is two times U1. Thus, the folded over outer portion 160 creates a standoff having a thickness U1 that results in a limiting compression feature 112 of the limiting spring washer 110.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A limiting spring washer assembly comprising:
   a part defining a part aperture therethrough;
   a bolt configured to attach the part to an item, the bolt having a head and a shaft;
   a limiter disposed within the part aperture, the limiter defining a limiter aperture therethrough, the shaft being disposed within the limiter aperture; and
   a limiting spring washer having a main body portion defining a washer aperture therethrough, the main body portion having a main body thickness, a frustoconical portion extending at an angle with respect to the main body portion in an uncompressed state, and the limiting spring washer defining a connection portion between the main body portion and the frustoconical portion;

the limiter defining the limiter aperture therethrough, the shaft being disposed within the limiter aperture and through the washer aperture, the head having a contact surface contacting the main body portion of the limiting spring washer, the frustoconical portion having a leg thickness, the main body thickness being greater than the leg thickness, the main body extending away from the connection and toward the head creating a space between the head and the connection portion, wherein the frustoconical portion cannot contact the head.

2. The limiting spring washer of claim 1, the main body portion having a flat base surface disposed in a base plane, the angle being in the range of 110 degrees to 178 degrees.

3. The limiting spring washer of claim 2, the main body portion having an external surface opposite the base surface and disposed in an outer plane that is parallel to the base plane, the main body thickness extending between the base surface and the external surface.

4. The limiting spring washer of claim 3, the external surface and the outer plane being offset from the side portion.

5. The limiting spring washer of claim 4, the frustoconical portion defining a circular outer edge that is offset from the base plane and the outer plane.

6. The limiting spring washer of claim 5, the main body portion defining a solid annulus having the main body thickness.

7. The limiting spring washer of claim 5, the main body portion comprising an inner portion and an outer portion, the base surface being disposed on the inner portion and the external surface being disposed on the outer portion, the outer portion being folded onto the inner portion via a connecting portion, the main body thickness being defined as extending through both the inner and outer portions.

8. The limiting spring washer of claim 5, wherein the limiting spring washer is formed of a spring steel.

9. A bolt assembly comprising:
a part defining a part aperture therethrough;
a bolt configured to attach the part to an item, the bolt having a head and a shaft;
a limiter disposed within the part aperture;
a limiting spring washer disposed in contact with the limiter, the bolt, and the part, the limiting spring washer comprising:
 a main body portion defining a washer aperture therethrough, the main body portion having a main body thickness, a base surface disposed in a base plane, and an external surface disposed opposite the base surface and disposed in an outer plane that is parallel to the base plane, the base surface contacting the limiter and the external surface contacting the head;
 a frustoconical portion extending from the main body portion, the frustoconical portion having a leg thickness, the main body thickness being greater than the leg thickness,
 the main body portion comprising an inner portion and an outer portion, the base surface being disposed on the inner portion and the external surface being disposed on the outer portion, the outer portion being folded onto the inner portion via a connecting portion,
 the main body thickness being defined as extending through both the inner and outer portions,
 the frustoconical portion extending from the inner portion, wherein the bolt is configured to apply a total load, a first portion of the total load being absorbed by the part, and a second portion of the total load being absorbed by the limiter.

10. The bolt assembly of claim 9, the limiter defining a limiter aperture therethrough, the shaft being disposed within the limiter aperture and through the washer aperture, the head having a contact surface contacting the main body portion of the limiting spring washer, the contact surface being free of contact with the limiter.

11. The bolt assembly of claim 10, the contact surface being free of contact with the frustoconical portion of the limiting spring washer.

12. The bolt assembly of claim 9, the limiter defining an upper surface in an upper plane, the upper plane being coplanar with the base plane such that the base surface of the limiting spring washer is flatly pressed against the upper surface of the limiter.

13. The bolt assembly of claim 12, the main body thickness extending between the base surface and the external surface, the head having a contact surface disposed in a contact plane, the contact surface contacting the external surface of the main body portion of the limiting spring washer, the outer plane being coplanar with the contact plane such that the external surface of the limiting spring washer is flatly pressed against the contact surface of the head of the bolt.

14. The bolt assembly of claim 13, the frustoconical portion extending at an angle with respect to the base surface of the limiting spring washer, the angle being in the range of 110 degrees to 178 degrees, the frustoconical portion contacting the part.

15. The bolt assembly of claim 14, the external surface of the limiting spring washer and the outer plane being offset from the frustoconical portion of the limiting spring washer.

16. The bolt assembly of claim 15, the frustoconical portion of the limiting spring washer defining a circular outer edge that is offset from the base plane and the outer plane.

17. The bolt assembly of claim 16, the main body portion of the limiting spring washer defining a solid annulus having the main body thickness.

18. The bolt assembly of claim 16, wherein the part is formed of a composite material and the limiter is formed of a metallic material.

19. A bolt assembly comprising:
a part defining a part aperture therethrough;
a bolt configured to attach the part to an item;
a limiter disposed within the part aperture, the limiter defining an upper surface in an upper plane;
a limiting spring washer disposed in contact with the limiter, the bolt, and the part, the limiting spring washer comprising:
 a main body portion defining a washer aperture therethrough, the main body portion having a main body thickness, and a base surface that is flat and is disposed in a base plane, the upper plane of the limiter being coplanar with the base plane such that the base surface of the limiting spring washer is flatly pressed against the upper surface of the limiter;
 a frustoconical portion extending from the main body portion, the frustoconical portion having a leg thickness, the main body thickness being greater than the leg thickness, the frustoconical portion extending at an angle with respect to the base surface of the limiting spring washer, the angle being in the range of 110 degrees to 178 degrees, the frustoconical portion contacting the part, wherein the bolt is configured to apply a total load, a first portion of the total load being absorbed by the part, and a second portion of the total load being absorbed by the limiter, wherein the limiting spring washer comprises an external surface on the main body portion, the external surface disposed opposite the base surface and disposed in an outer plane that is parallel to the base plane, the main body thickness extending between the base surface and the external surface, the bolt comprising a head and a shaft, the head having a contact surface disposed in a contact plane, the contact surface contacting the external surface of the main body portion of the limiting spring washer, the outer plane being coplanar with the contact plane such that the external surface of the limiting spring washer is flatly pressed against the contact surface of the head of the bolt, the external surface of the limiting spring washer and the outer plane being offset from the frustoconical portion of the limiting spring washer, the frustoconical portion of the limiting spring washer defining a circular outer edge that is offset from the base plane and the outer plane, the main body portion of the limiting spring washer comprising an inner portion and an outer portion, the base surface being disposed on the inner portion and the external surface being disposed on the outer portion, the outer portion being folded onto the inner portion via a connecting portion, the main body thickness being defined as extending through both the inner and outer portions, the main body portion of the limiting spring washer comprising an inner portion and an outer portion, the base surface being disposed on the inner portion and the external surface being disposed on the outer portion, the outer portion being folded onto the inner portion via a connecting portion, the main body thickness being defined as extending through both the inner and outer portions, the frustoconical portion extending from the inner portion.

20. The bolt assembly of claim 18, wherein at least 54% of the total load is absorbed by the limiter.

\* \* \* \* \*